(12) United States Patent
Carr

(10) Patent No.: US 10,246,019 B1
(45) Date of Patent: Apr. 2, 2019

(54) AUXILIARY STEP FOR VEHICLES

(71) Applicant: Jeffrey Carr, Murrieta, CA (US)

(72) Inventor: Jeffrey Carr, Murrieta, CA (US)

( * ) Notice: Subject to any disclaimer, the term of this patent is extended or adjusted under 35 U.S.C. 154(b) by 0 days.

(21) Appl. No.: 15/789,239

(22) Filed: Oct. 20, 2017

Related U.S. Application Data

(62) Division of application No. 13/506,758, filed on May 15, 2012, now Pat. No. 9,902,326.

(51) Int. Cl.
*B60R 3/02* (2006.01)

(52) U.S. Cl.
CPC .................................. *B60R 3/02* (2013.01)

(58) Field of Classification Search
CPC .............. B60R 3/00; B60R 3/007; B60R 3/02
See application file for complete search history.

(56) References Cited

U.S. PATENT DOCUMENTS

| | | | |
|---|---|---|---|
| 1,953,298 A | 4/1934 | Goodwin | |
| 2,118,557 A | 5/1938 | Hamilton | |
| 2,158,949 A | 5/1939 | Sarles et al. | |
| 2,218,060 A | 10/1940 | Watson | |
| 2,492,068 A | 12/1949 | Schofield et al. | |
| 2,670,968 A | 3/1954 | Duffy | |
| 3,229,993 A | 1/1966 | Riddle | |
| 3,341,223 A | 9/1967 | Wampfler | |
| 3,627,350 A | 12/1971 | Cross | |
| 3,671,058 A | 6/1972 | Kent | |
| 3,758,134 A | 9/1973 | Stewart | |
| 3,887,217 A | 6/1975 | Thomas | |
| 3,980,319 A | 9/1976 | Kirkpatrick | |
| 4,017,093 A | 4/1977 | Stecker, Sr. | |
| 4,110,673 A | 8/1978 | Magy | |
| 4,185,849 A * | 1/1980 | Jaeger | B60R 3/02 105/445 |
| 4,194,754 A | 3/1980 | Hightower | |
| 4,274,648 A | 6/1981 | Robins | |
| 4,400,127 A | 8/1983 | Metz | |
| 4,462,486 A | 7/1984 | Dignan | |
| 4,557,494 A | 12/1985 | Elwell | |
| 4,744,590 A | 5/1988 | Chesney | |
| 4,750,753 A | 6/1988 | Dezern | |
| 4,800,471 A | 1/1989 | Lippert | |
| 4,906,015 A | 3/1990 | LaCrois et al. | |
| 4,953,065 A | 8/1990 | Kao | |
| D316,394 S | 4/1991 | Carr | |
| 5,038,983 A | 8/1991 | Tomososki | |
| D324,019 S | 2/1992 | Bailey | |
| 5,195,609 A | 3/1993 | Ham et al. | |
| RE34,275 E | 6/1993 | Ramsey | |

(Continued)

FOREIGN PATENT DOCUMENTS

FR     2264688     10/1975

*Primary Examiner* — James M Dolak
(74) *Attorney, Agent, or Firm* — Stout, Uxa & Buyan, LLP; Donald E. Stout

(57) ABSTRACT

An auxiliary pullout step for a vehicle having a yieldingly resilient mechanism for urging the step into the extended step position thereof and resisting movement of the step into a retracted position thereof and an indexing mechanism for selectively restraining the step in the retracted position thereof and selectively releasing the step from the restrained position thereof to allow the yieldingly resilient mechanism to move the step into the extended step position.

11 Claims, 20 Drawing Sheets

(56) References Cited

U.S. PATENT DOCUMENTS

| | | |
|---|---|---|
| 5,342,073 A | 8/1994 | Poole |
| 5,478,124 A | 12/1995 | Warrington et al. |
| D370,452 S | 6/1996 | Beasley |
| 5,538,269 A | 7/1996 | McDaniel et al. |
| 5,690,260 A | 11/1997 | Aikins et al. |
| 5,738,362 A | 4/1998 | Ludwick |
| 5,803,475 A | 9/1998 | Dick |
| D409,557 S | 5/1999 | Armour |
| 5,979,094 A | 11/1999 | Bfrafford, Jr. et al. |
| 6,095,387 A | 8/2000 | Lipscomb |
| 6,170,842 B1 | 1/2001 | Mueller |
| 6,357,773 B1 | 3/2002 | Greer et al. |
| 6,471,002 B1 | 10/2002 | Weinerman |
| 6,511,086 B2 | 1/2003 | Schlicht |
| 6,533,303 B1 | 3/2003 | Watson |
| 6,655,706 B1 * | 12/2003 | Murrell ............... B60R 3/02 182/88 |
| 6,659,485 B2 | 12/2003 | Ueno |
| 6,685,204 B1 | 2/2004 | Hehr |
| D491,509 S | 6/2004 | Bundy |
| 6,880,843 B1 * | 4/2005 | Greer, Jr. ............ B60R 3/02 280/166 |
| 6,986,523 B1 | 1/2006 | Bickford |
| 6,994,362 B2 | 2/2006 | Foster |
| 7,111,859 B2 | 9/2006 | Kim |
| 7,185,904 B1 | 3/2007 | Jones et al. |
| 7,469,916 B2 | 12/2008 | Watson |
| 7,494,144 B1 | 2/2009 | Carr |
| D602,416 S | 10/2009 | Corwin |
| 7,766,357 B2 | 8/2010 | Arvanites |
| 7,926,827 B2 | 4/2011 | Kircher |
| 7,971,891 B2 * | 7/2011 | Kircher ............... A61G 3/061 280/163 |
| 8,177,247 B1 | 5/2012 | Carr |
| 8,297,635 B2 * | 10/2012 | Agoncillo ............ B60R 3/02 280/163 |
| 8,668,217 B2 * | 3/2014 | Ziaylek ............... B60R 3/02 280/163 |
| 9,302,626 B2 | 4/2016 | Leitner |
| 9,302,719 B1 | 4/2016 | Krishnan |
| 9,346,405 B2 | 5/2016 | Leitner |
| 9,487,148 B2 | 11/2016 | Kichline, Jr. |
| 9,505,330 B2 | 11/2016 | Hirtenlehner |
| 9,682,658 B2 * | 6/2017 | Nam .................... B60R 3/02 |
| 9,701,249 B2 | 7/2017 | Leitner |
| 9,776,571 B2 | 10/2017 | Fortin |
| 9,821,718 B2 * | 11/2017 | Knothe ................ B60R 3/02 |
| 9,902,328 B1 * | 2/2018 | Mazur .................. B60R 3/02 |
| 9,975,490 B1 * | 5/2018 | Ozog ................... B60R 3/02 |
| 10,106,069 B2 * | 10/2018 | Rasekhi ............... B61D 23/025 |
| 10,106,088 B2 * | 10/2018 | Smith .................. B60R 3/02 |
| 2004/0160034 A1 | 8/2004 | Mitchell |
| 2005/0146112 A1 | 7/2005 | Bang et al. |
| 2006/0049650 A1 | 3/2006 | Evans |
| 2007/0267842 A1 | 11/2007 | Seibert et al. |
| 2008/0224438 A1 | 9/2008 | Okada |

* cited by examiner

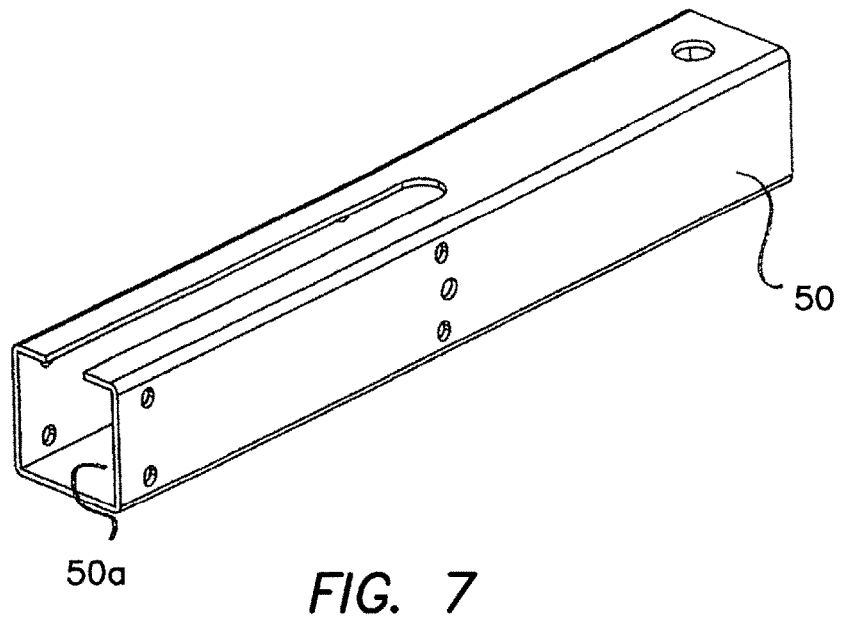
FIG. 7
FIG. 8
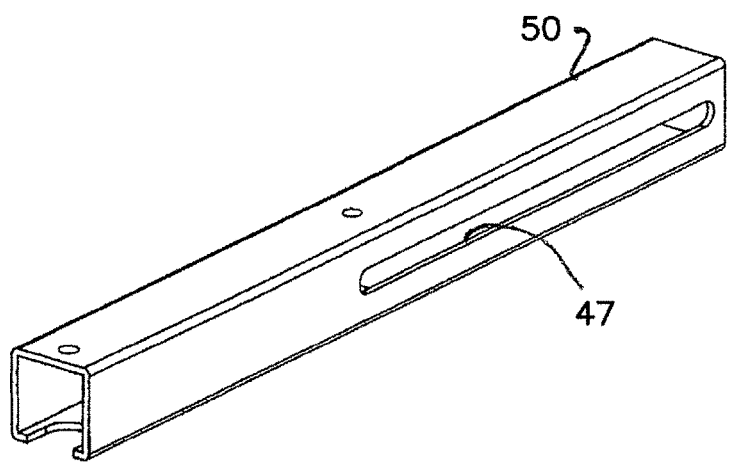

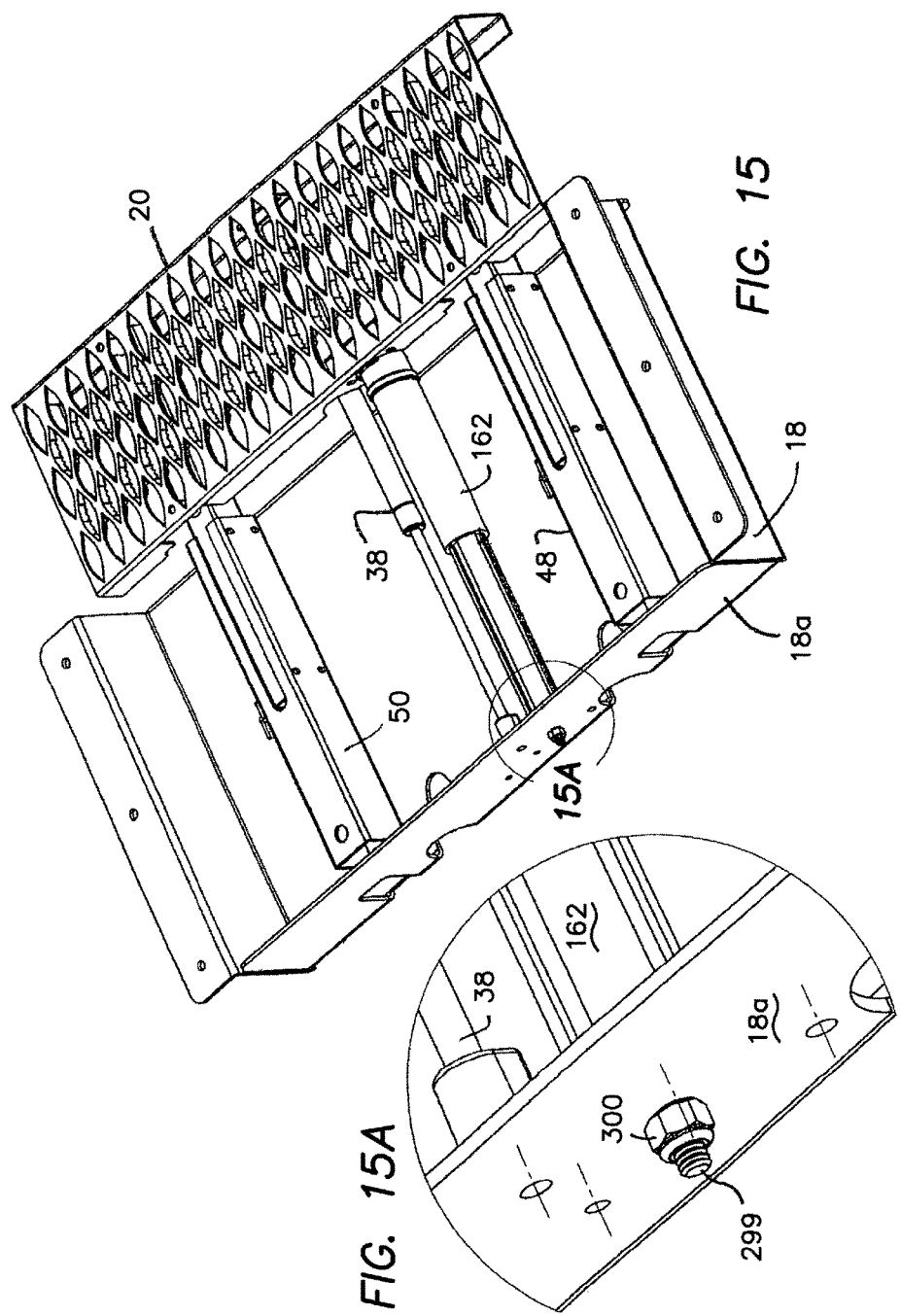

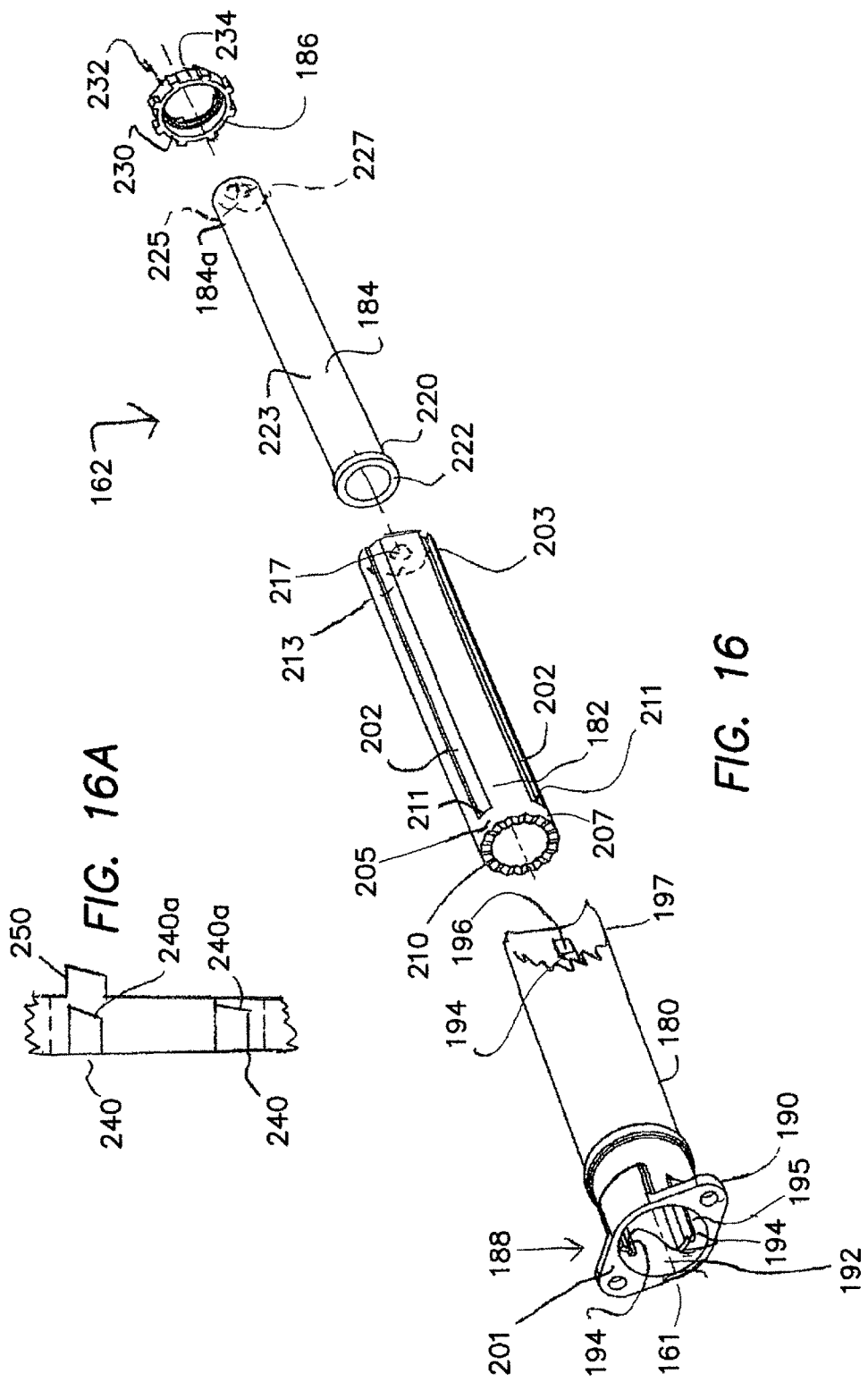

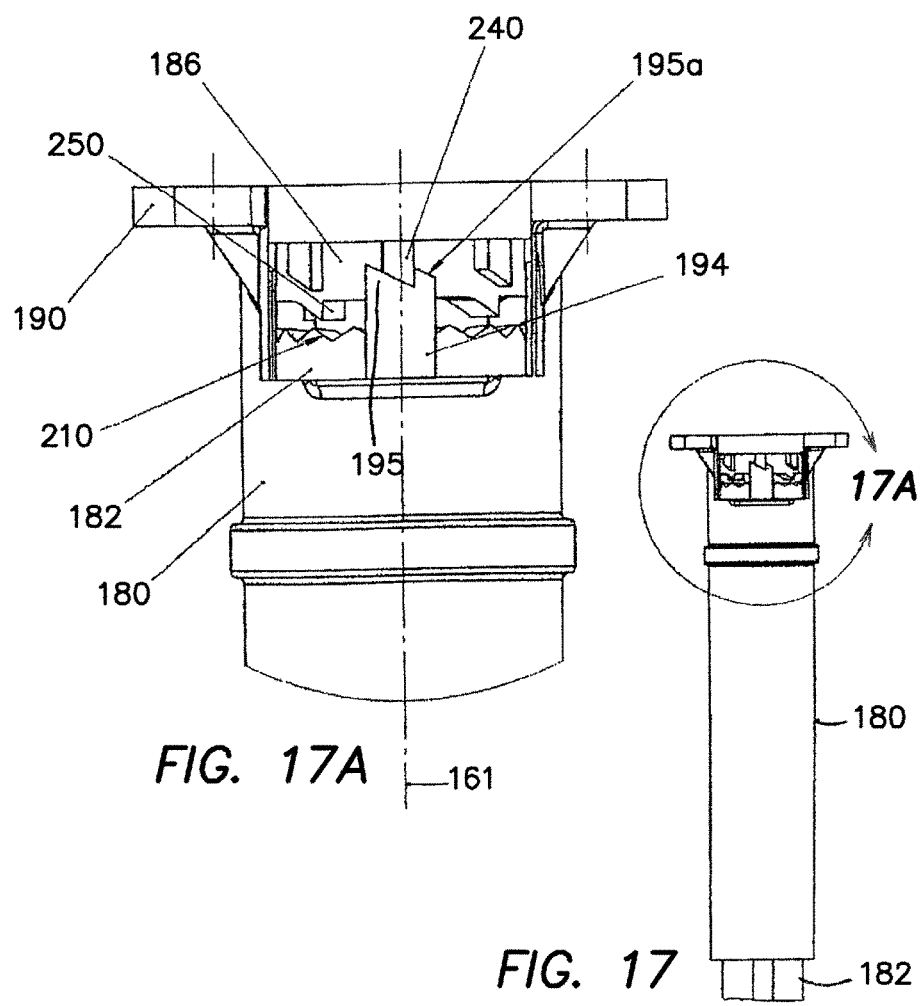

AUXILIARY STEP FOR VEHICLES

REFERENCE TO RELATED APPLICATIONS

This application is a Division of my co-pending application Ser. No. 13/506,758, filed May 15, 2012 and the teaching and technology thereof are incorporated by reference herein.

BACKGROUND OF THE INVENTION

Field of the Invention

This invention relates to the auxiliary vehicle step art and more particularly to an auxiliary step arrangement that may be bolted to the underside of a vehicle and which auxiliary step arrangement has a step therein movable from a first, retracted position to a second, step position and in which the step is sequentially and automatically locked when in the retracted position and automatically un-locked with each movement between the retracted position and the step position.

Description of the Prior Art

In many vehicle applications it is desirable to provide a step on the vehicle to allow a person to step thereon in order to facilitate reaching various portions of the vehicle. There have hereto fore been proposed various step arrangements that may be mounted on a vehicle to provide the convenient access to the desired portion of the vehicle. Some of these prior movable, auxiliary step arrangements have provided a step that may be connected to the vehicle and may be positionable under the vehicle, if desired, while the vehicle is being driven and extendable from the vehicle when it is desired to use the step. Many of these movable, auxiliary step arrangements have incorporated complex mechanical systems that increased the cost thereof sand/or have required extensive modifications to the vehicles in order to install them. Other step devices have shown systems that, in practice, have not proven to be reliable over long periods of time thereby often resulting in frequent repair or replacement. Still other of such movable steps have not been rugged enough to withstand the heavy use thereof often required in many applications.

In utilization of such auxiliary steps, it is desirable to have the step locked when in the retracted position so as to avoid undesirable opening of the step when the step is not in use and also easily unlocked to be moved from the retracted position to the step position and retained in the step position to prevent inadvertent retraction of the step when it is desired to utilize the step.

Accordingly, it has long been desired to provide a rugged, movable step that is conveniently attachable to a vehicle. Such step should have the mechanism for easily locking the step in the retracted position as well as easily or automatically restraining the step in the step position to prevent inadvertent retraction thereof. It is also desired that such step is comparatively inexpensive to fabricate and is free of complex mechanical components.

It is an object of the present invention to provide a step arrangement that may be fastened to a vehicle and in which the step arrangement is movable between a retracted position in which the step is moved inwardly with respect to vehicle and a step position wherein the step is extended outwardly from the vehicle.

It is another object of the present invention to provide a step arrangement that may be fastened to a vehicle and in which the step arrangement is movable between a retracted position in which the step is moved inwardly with respect to vehicle and a step position wherein the step is extended outwardly from the vehicle and in which the step is selectively and sequentially moved from a locked condition in the retracted position to a restrained condition in the step position thereof.

It is another object of the present invention to provide a step arrangement that may be fastened to a vehicle in which the step may be easily moved between a locked, retracted condition to a restrained step condition.

It is another object of the present invention to provide a step arrangement that may be fastened to a vehicle in which the step may be easily moved from a locked, retracted condition to a restrained step condition and in which the components of the step assembly arrangement are rugged construction and free of overly complex mechanical components and which will last for comparatively long times in use.

SUMMARY OF THE INVENTION

The above and other objects of the present invention are achieved, in a preferred embodiment of an auxiliary step for attachment to a vehicle by providing a frame that is attachable to the underside of a vehicle such as a pickup truck or other vehicle. Such vehicles often require access to either the storage bed of the truck, the roof of the truck or other portions and the access thereto is facilitated by having a step upon which a person may stand to reach the desired portions. However, the step is preferably positioned and retained under the vehicle in a restrained or retracted position when not in use and movable outwardly with respect to the vehicle into a step position when it is desired to utilize the step and the step is yieldingly restrained from moving from the step position to the restrained position.

A step with a tread member is provided and the step with the tread member is connected to a pair of rails which are operatively mounted on the frame and the step is movable relative to the frame in reciprocal directions with respect to the frame and to the vehicle such that in a retracted or restrained position of the step and tread, the step and tread are retained to be substantially under the vehicle and restrained in this position and in a step position the step and tread are extended outwardly from the vehicle.

A yieldingly resilient mechanism is provided to yieldingly restrain the step and tread in the step position of the step. The yieldingly resilient mechanism may be, for example, a coil spring for yieldingly urging the tread into the step position from the restrained position and yieldingly resisting movement of the tread from the step position to the retracted or restrained position. In another preferred embodiment of the present invention the yieldingly resilient mechanism is provided by a conventional gas spring cylinder of the type often utilized on hoods, hatch backs and similar components of vehicles. The gas spring cylinder urges the step outwardly from the retracted or restrained position to the step position and yieldingly resists motion of the step from the step position to the retracted position.

An indexing mechanism is provided which is operatively connected to the step and to the frame. The indexing mechanism locks the step in the retracted or restrained position against the force of the resilient mechanism and is movable from the locked condition in the retracted or restrained position to a release position wherein the step is moved from the locked, retracted or restrained position to the step position under the force of the resilient mechanism.

In a first preferred embodiment of the present invention, the indexing mechanism has a slotted track member which is attached to the frame. A guide pin is resiliently and pivotally mounted on the step and the guide pin moves in the track of the slotted track member during movement of the step between the step position and the retracted or restrained position. An elongated spring like member which may be a length of spring steel has a first end mounted on the step for limited lateral pivotal movement and the spring like member urges the pin downward into contact with the slots in the slotted track member and resists movement of the pin upward from the slotted track member. The track is configured to have a first portion of a slot defining restraining portion for restraining the pin and thereby restraining the step in the retracted or restrained position. The track also has a second portion of the slot for guiding the pin to a release position wherein the guide pin then moves in a third portion of the slot from the release position to the extended position wherein the step is in the step position. The track has a fourth portion of the slot wherein the guide pin moves from the extended position to the restraining position.

In another embodiment of the present invention, the indexing mechanism is provided by a multi-part telescoping tube arrangement. The multi-part telescoping indexing mechanism has an outer tube with a flanged first end fixedly coupled to the step and the outer tube moves with the step as the step moves between the step position and the retracted or restrained position. An intermediate tube is slidably mounted in the outer tube for axially reciprocating motion with respect to the outer tube. A plurality of tracks extend axially on the inside surface of the outer tube and the tracks have a an inwardly directed tab at the inner end of the outer tube which engage grooves or slots on the outer surface of the intermediate tube to prevent relative rotational movement of the intermediate tube with respect to the outer tube. The grooves or slots on the outer surface of the intermediate tube extend from the inner end of the intermediate tube to a stop located a spaced a preselected distance from the outer end of the intermediate tube to prevent the intermediate tube from axial movement which would allow the intermediate tube to extend axially past the inner end of the outer tube when the step is moved to the step position. Thus, at least a portion of the intermediate tube is always restrained in the outer tube.

An inner tube is mounted in the intermediate tube. Both the inner end of the intermediate tube and the inner end of the inner tube are provided with a disc like plate to close the ends of the tubes and the disc like plates have a central aperture extending therethrough. A bolt having a bolt head is positioned in the inner tube and the bolt extends through the apertures in the disc like plates and through an aperture in the frame. A nut fastens the bolt as well as the inner tube and intermediate tube to the frame. A spring is provided between the bolt head and the inside surface of the disc like plate in the inner tube to yieldingly restrain the nut in engagement with the frame. The inner tube and the intermediate tube move together in axial directions in the outer tube in movement between the step position and the retracted or restrained position.

The inner end of the tracks on the inside surface of the outer tube have the tabs extending inwardly to project into the slots on the outer surface of the intermediate tube to engage the stop portion on the outer surface of the intermediate tube at the outer end of the slots so as to limit the travel of the intermediate tube relative to the outer tube when the step is in the step position thereof and also to prevent relative rotation of the intermediate tube relative to the outer tube The outer end of the inner tube has a shoulder and a ring gear is slidably mounted on the outer surface of the inner tube and abuts against the shoulder. The outer end of the intermediate tube has a plurality of teeth thereon. The ring gear has two sets of teeth thereon. A first of the sets of teeth on the ring gear are equally spaced on the outer peripheral surface and the second set of teeth on the ring gear are equally spaced on the inner end surface of the ring gear. The second set of teeth on the ring gear are adapted to selectively engage the teeth on the end surface of the intermediate tube.

The tracks on the inside surface of the outer tube have a plurality of teeth thereon spaced from the outer end of the outer tube. The number of tracks and consequently the number of teeth on the outer end of the tracks correspond to the number of the second set of teeth on the inner surface of the ring gear. The second set of teeth on the inner surface of the ring gear are adapted to operatively engage the teeth on the outer ends of the tracks on the inside surface of the outer tube. The first set of teeth on the outer peripheral surface of the ring gear are adapted to operatively engage the plurality of teeth on the outer end of the intermediate tube. The spacing between the first set of teeth on the outer peripheral surface of the ring gear allows the ring gear to selectively slide past the teeth on the outer end of the tracks and slide along the tracks without relative rotary motion between the ring gear and the outer tube as the intermediate tube and the inner tube travel between the step position and the retracted position.

For the condition of the auxiliary step in the retracted position, the selective engage of the various teeth on the indexing mechanism provides a locked condition under the force exerted thereon by the yieldingly resilient mechanism to prevent relative movement of the auxiliary step from the retracted position. When it is desired to move the auxiliary step to the step position, a slight inward movement of the step against the force of the yieldingly resilient mechanism towards the vehicle releases the engagement of the teeth and allows the yieldingly resilient mechanism to extend the step to the step position.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 7 is a perspective view of a stationary channel useful in the practice of the present invention;

FIG. 8 is a perspective view of the stationary channel of FIG. 7 shown in a reverse orientation;

FIG. 15 is a perspective view taken along the line 15-15 of FIG. 13;

FIG. 15A is a perspective view of the circled portion of FIG. 15 denoted by the identifier 15A;

FIG. 16 is an exploded perspective view of an indexing mechanism useful in the embodiment shown in FIG. 13;

FIGS. 17 through 22 illustrate the indexing mechanism of FIG. 16 in various operational positions thereof.

DESCRIPTION OF THE PREFERRED EMBODIMENTS

Figure 1:
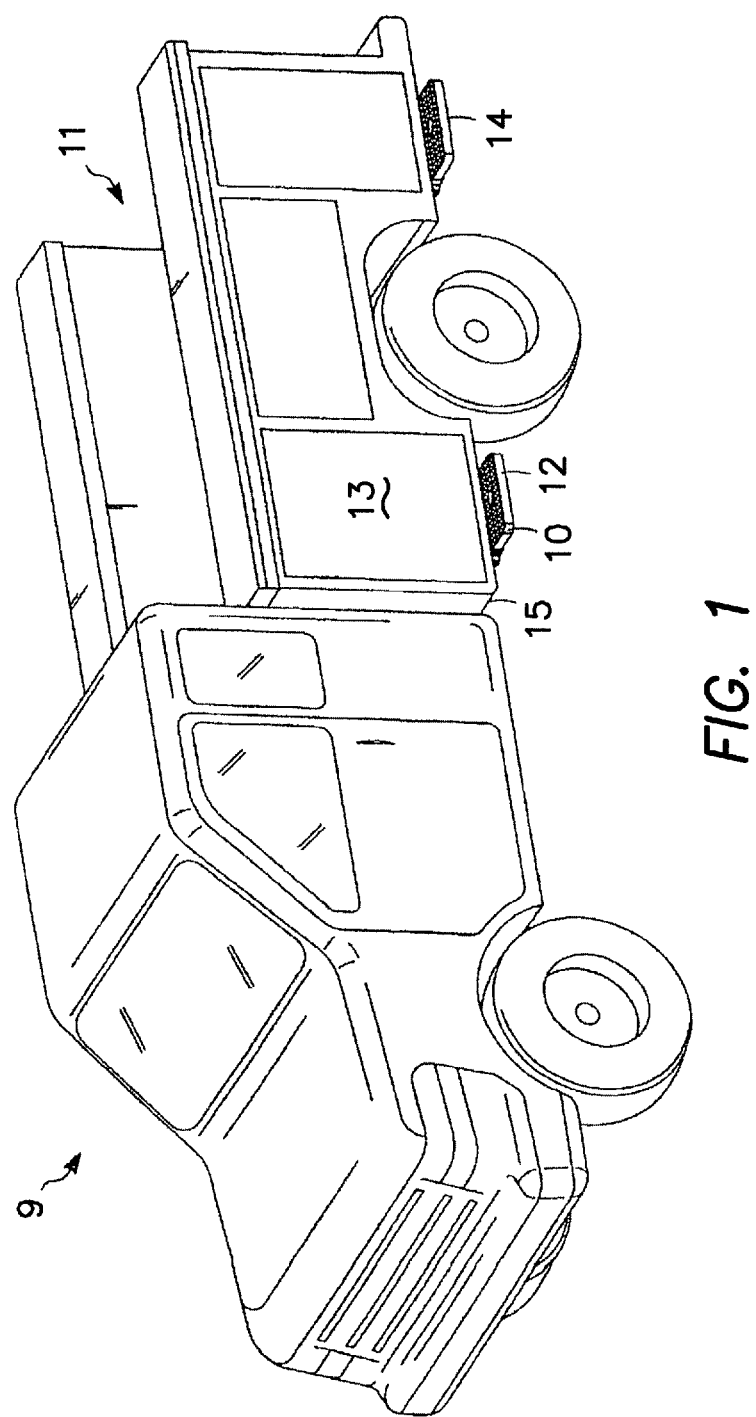
FIG. 1 is a perspective view of a vehicle showing two of the steps of the present invention installed thereon and the steps in the step position thereof.

Referring now to the drawing, there is shown on FIG. 1 a perspective view of a vehicle 9 of the type having a storage bed 11. Access to the storage bed 11 from the sides of the vehicle such as side 13 is often hindered in such vehicles by the height of the side above the ground level. In order to provide convenient access to the bed 11, steps of a preferred embodiment 10 of the present invention as indicated at 12 and 14 are installed on the underside 15 of the vehicle 9. While two installations are shown on FIG. 1, many vehicles are of a size such that only one step may be required. The step of the present invention may be installed on one side of the vehicle 9 or on both sides of the vehicle as desired for particular applications, or installed on one or more than one location as may be required or desired in other applications.

Figure 2:
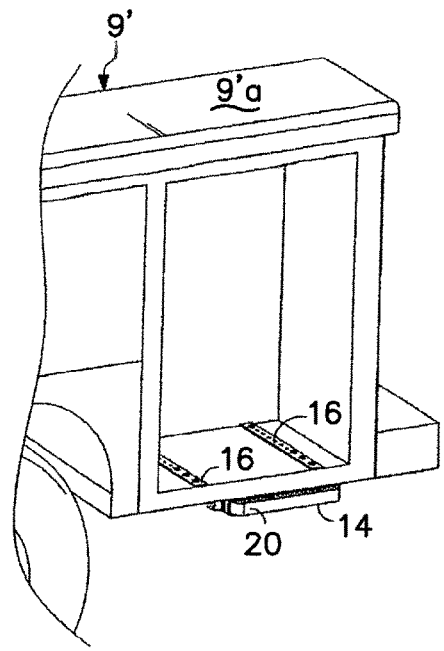
FIG. 2 is a partial perspective view of a vehicle similar to the vehicle of FIG. 1 showing a step in the retracted position.
Figure 3:
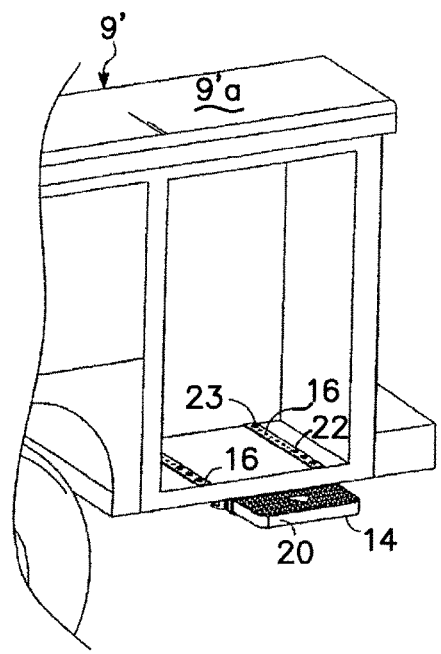
FIG. 3 is a partial perspective view of the vehicle of FIG. 2 showing the step in the step position thereof.

FIG. 2 illustrates a vehicle 9' in which the step 14 is installed to allow access to the roof 9'a of the vehicle 9'. In FIG. 2 the step 14 is shown in the retracted position and for the installation in a vehicle such as vehicle 9', a pair of support straps 16 may be installed to provide additional support for the step 14. FIG. 3 shows the step 14 as installed on the vehicle 9' in the step position thereof As shown there is a tread 20 that is reciprocatingly movable between the retracted position shown in FIG. 2 and the step position as shown in FIG. 3.

Figure 3A:
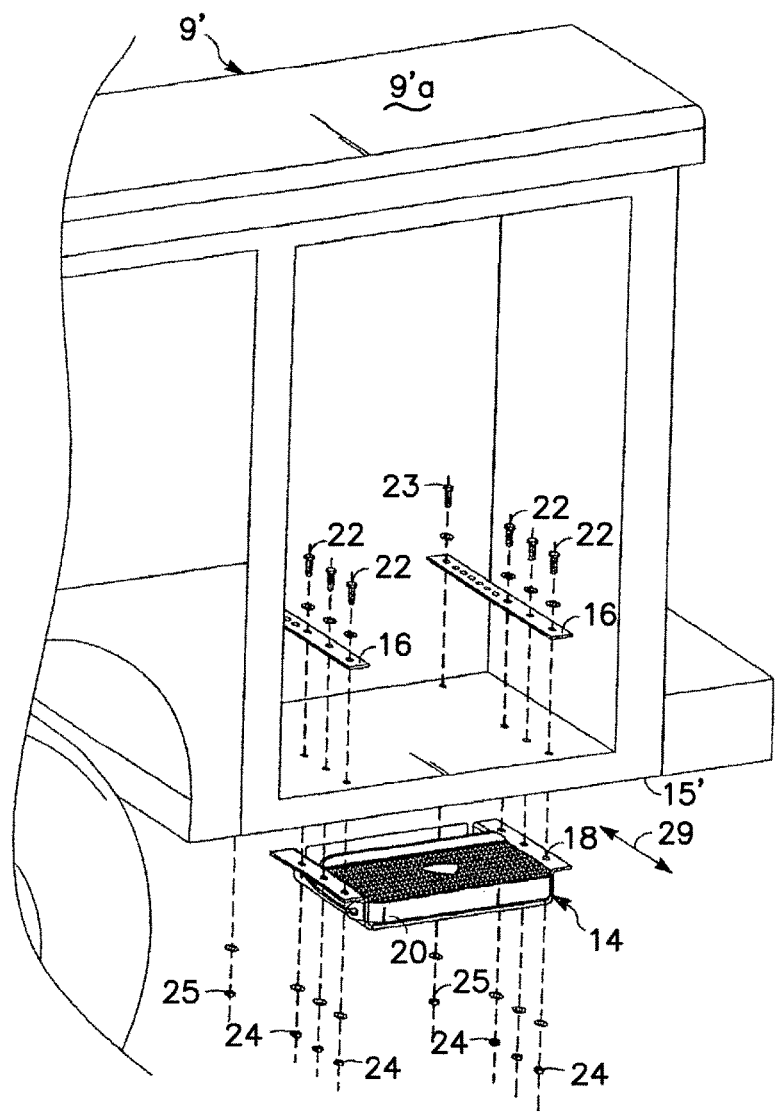
FIG. 3A is a partial perspective view, similar to FIG. 2 showing an exploded view of the step of the present invention as installed on a vehicle.

FIG. 3A shows the step 14 as installed in the vehicle 9' in an exploded perspective view of the step 14. As shown thereon, the tread 20 is mounted on a frame 18 which is bolted by bolts 22 and nuts and washers 24 to an underside 15' of the truck 9' which also connect the support straps 16 for the additional support as may be required in some applications. There may also be provided bolts 23 and nuts and washers 25 for additional support extending through the support straps 16. The tread 20 is reciprocatingly movable in the directions of the double ended arrow 29 with respect to the frame 18, as well as the vehicle 9', on which the tread 20 is mounted.

Figure 4:
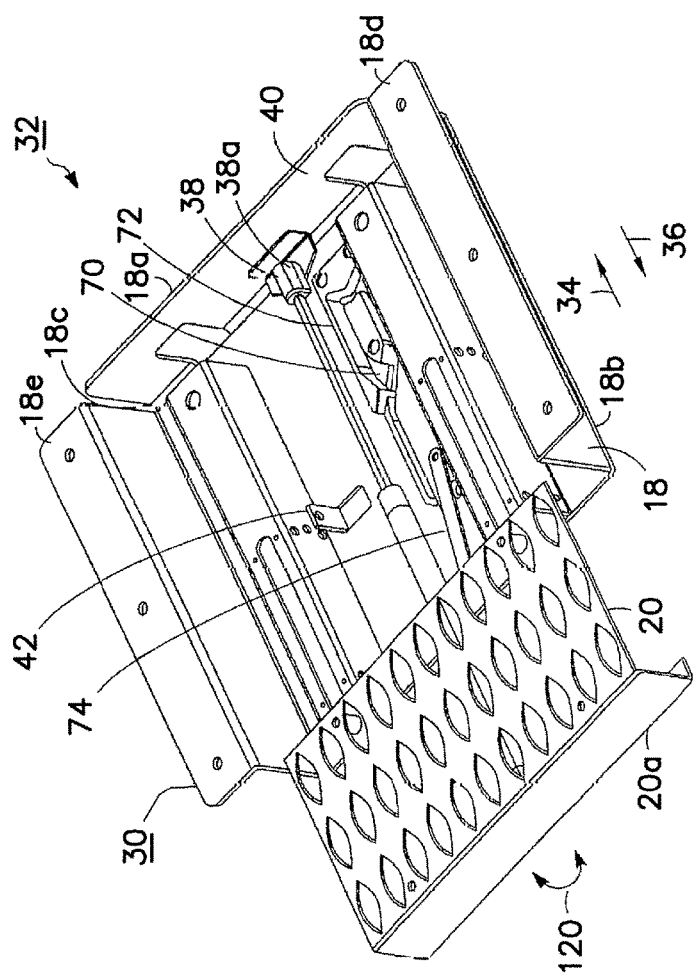
FIG. 4 is perspective view of one embodiment of the present invention in the step position.
Figure 5:
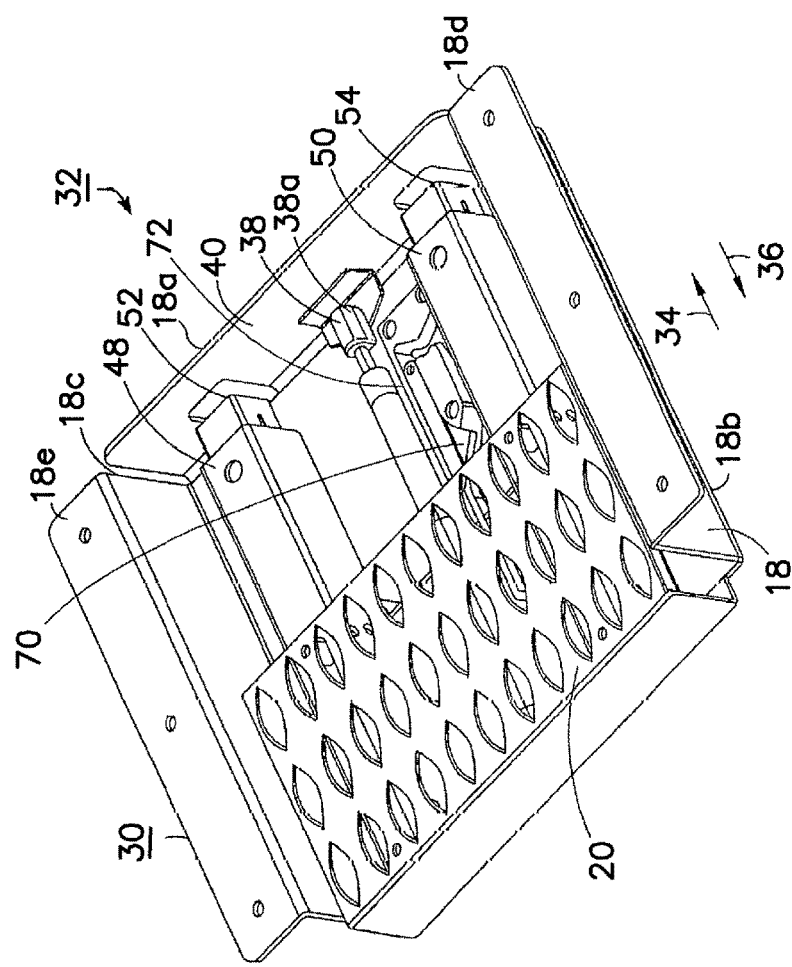
FIG. 5 is a perspective view of the embodiment shown in FIG. 4 in the retracted position thereof.

FIG. 4 illustrates an exploded view of a step arrangement 30 of an embodiment 32 having a frame 18 on which a tread 20 is movably mounted for reciprocating motion with respect to the frame 18 in the directions of the arrow 34 from the step position thereof to the retracted position thereof as shown in FIG. 5 and in the direction of the arrow 36 from the retracted position thereof as shown in FIG. 5 to the step position thereof as shown in FIG. 4.

Figure 12:
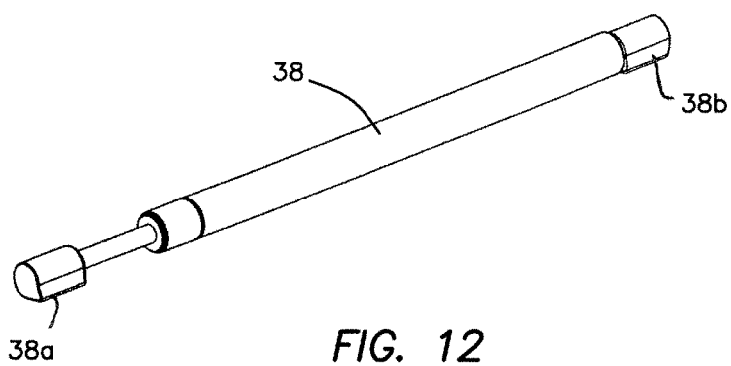
FIG. 12 is a perspective view of a gas spring cylinder useful in the practice of the present invention.

The embodiment 32 has a yieldingly resilient mechanism which, in the embodiment 32, is a gas spring cylinder 38 which resists movement of the tread 20 in the direction of the arrow 34 and urges the tread 20 in the direction of the arrow 36. The gas spring cylinder may be of the type presently available as utilized on, for example, hoods, hatch backs and the likes of many vehicles. The gas spring cylinder is illustrated in FIG. 12 and has a first end 38a which is attached to the inner end 40 of the frame 18 and an second end 38b which is attached to the outer wall 20a of the tread 20. Other types of resilient mechanisms such as a coil spring, leaf spring or the like could be utilized to provide the function of the gas spring cylinder 38.

Figure 6:
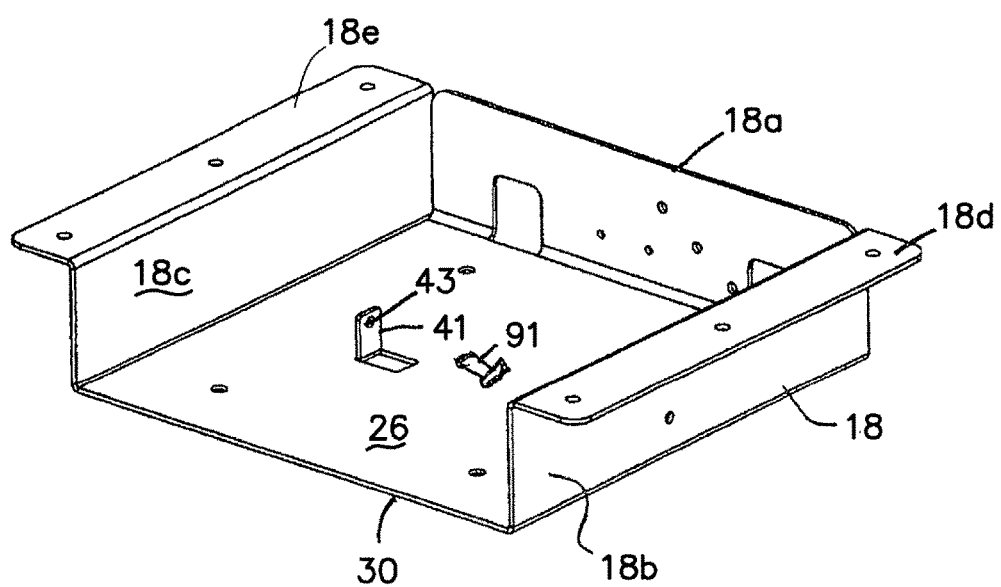
FIG. 6 is a perspective view of a frame useful in the practice of the present invention.

FIG. 6 shows a perspective view of the frame 18. The frame 18 has a base plate 26. The base plate 26 has the outer wall 20a, an inner edge 30. The base plate 26 is substantially planar. A pair of spaced apart side walls 18b and 18c are connected to and upstanding from the base plate 26. Each of the side walls 18a and 18b have a flange member 18d and 18e, respectively connected thereto. The flange members a8d and 18e extend outwardly from side walls 18a and 18b, respectively, in a direction away from the base plate 26. The flange members 18d and 18e are substantially coplanar and in a plane substantially parallel to the plane of the base plate 26.

A pair of guides 48 and 50 are mounted on the base plate 26 and the guide 48 is in regions adjacent the side edge 18c and the guide 50 is in regions adjacent the side edge 18b of the base plate 26. The guides 48 and 50 are substantially parallel to each other and to the side walls 18b and 18c. FIG. 7 shows a perspective view of the guide rail 48, the guide rail 50 being substantially identical thereto. As shown thereon, the guide rail 50 is substantially "box shaped" guides and the base 50a of the box shaped guides is affixed to the base plate 26.

A pair of rails 52 and 54 are connected to the tread 26 and mounted in the guides 48 and 50 for movement with the tread 20 In the preferred embodiment of the present invention the rail 52 is mounted in the box shaped guide 48 and the rail 54 is mounted in the box shaped guide 50. A mounting flange 41 is attached to the base plate 26 as shown on FIG. 6 and has an aperture 43 therein. A pin or bolt 91 (FIG. 13) may extend through the aperture 43 and ride in slot 47 The pin 91 tends to help maintain the alignment of the rail 54 in the guide 50.

Figure 9:
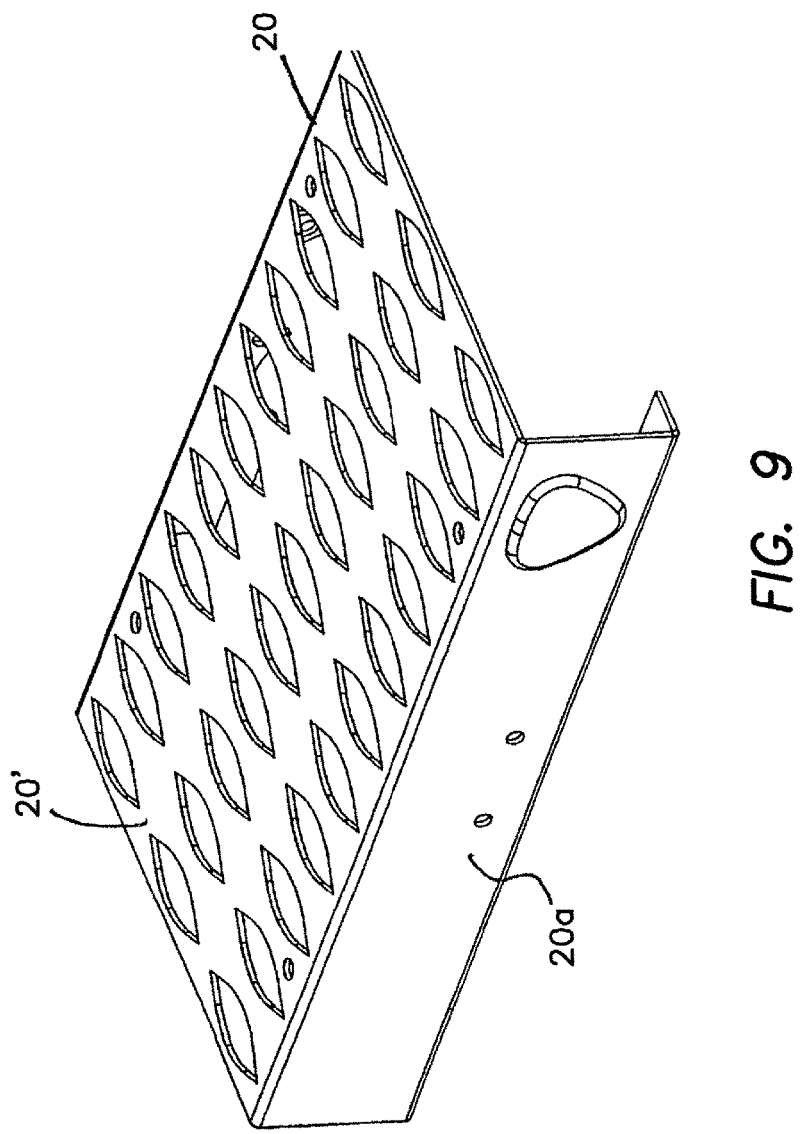
FIG. 9 is a perspective view of a tread useful in the practice of the present invention.

FIG. 9 illustrates the tread 20 of the step 14. As shown thereon, the tread 20 has an outer edge 20a to which the rails 52 and 54 as well as the gas spring cylinder are attached. The upper surface 20' of the tread 20 may be textured as shown in conventional patterns for added stability during use.

Figure 10:
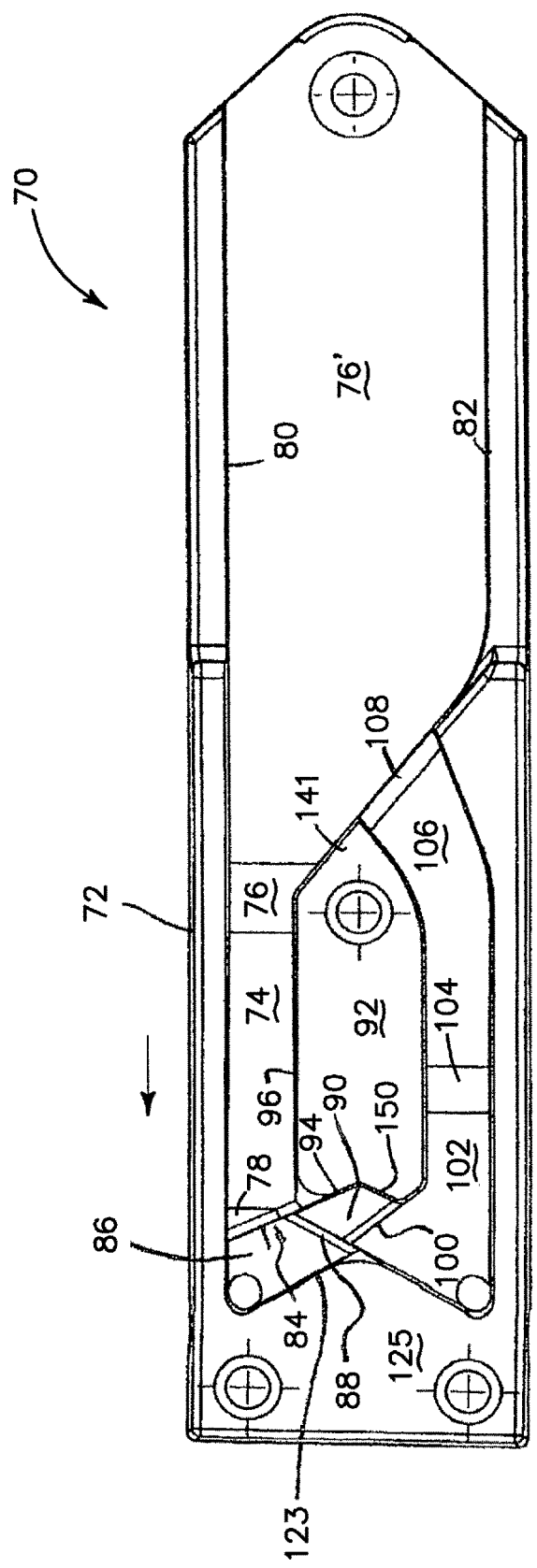
FIG. 10 is a top plan view of a guide plate useful in the indexing mechanism of the embodiment shown in FIG. 4.

The step 14 of the embodiment 32 is provided with an indexing mechanism generally indicated at 70 (FIG. 4) having a guide plate 72 and a spring loaded engagement pin 74. The guide plate 72 is attached to the base plate 26 and has a plurality of pin accepting slot paths therein. A top plan view of the guide plate 70 is shown in FIG. 10. A first slot path 74 extends from an outer end 76 which is at a base, lower level indicted at 76' bounded by the upstanding walls 80 and 82, upwardly to a second level indicated at 78' spaced higher from the base plate 26 to an inner end 78. The inner end 78 ends at a wall 84 bounding a second slot path 86 which ends in an inner wall 88 bounding a retention surface 90 at a lower level than the second slot path 86. A central wall member 92 is provided and has a first wall 96 bounding the first slot path 74 and a retention wall 94 bounding the retention surface 90. The retention surface 90 has a wall 100 forming a wall bounding a third slot path 102 which is lower than the retention surface 90. The inner end 104 of the third slot path 102 may be at the same level as the base level 78' and slopes upwardly to a second end 106 bounded by wall 108. The second end 106 is spaced a greater distance from the base plate 26 than the base level 76'.

Figure 11:
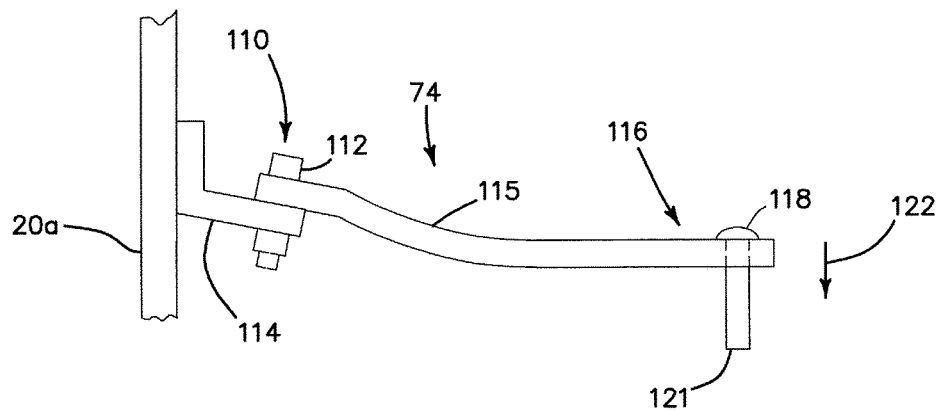
FIG. 11 illustrates a spring loaded guide pin for the indexing mechanism of the embodiment shown in FIG. 1.

FIG. 11 illustrates the engagement pin 74. The engagement pin 74 has a body 115 which is preferably fabricated of spring steel and has a mounting end 110 connected by bolt 112 to angle flange 114 that is fastened to the outer wall 20a of the tread 20. The connection of the connection end of the body 115 to the angle flange 114 allows for limited pivotal movement into and out of the plane of the paper as indicated by the double ended arrow 120 on FIG. 4 The engagement pin has a pin end 116 in which a pin 118 is attached. The body 115 of the engagement pin 74 urges the pin 118 in the direction of the arrow 122. The pin 118 has an outer end 121 which is adapted to slide in the slots of the guide plate 72.

The operation of the indexing mechanism 70 starting from the step position shown on FIG. 4 and moving against the force of the resilient mechanism to the retracted position shown in FIG. 5, the pin 118 slides from the level indicated at 76' in the first slot path 76 up to the wall 84. Upon reaching the wall 84, the outer end 121 of the pin drops to the level of the second slot path 86 and contacts the wall 123 in the end wall 125 of the guide 72. Releasing the force moving the tread allows the pin 118 to slide into the retention slot 150 in the wall 92. The force of the resilient mechanism keeps the pin 118 in this position.

When it is desired to move the tread from the retracted position of FIG. 4 to the step position of FIG. 5, the tread is moved slightly towards the inner end of the frame 18 which forces the pin 118 against the wall 123 and drops down to the level of the third slot path 102. The force of the resilient mechanism moves the tread outwardly with the pin 118 moving in the third slot path 102 upwardly to the wall 108 where it drops into the level 76'. The wall 108 prevents the pin 118 from moving into the third slot path 102 and guides the pin 118 to engagement with the wall 141 of the central wall member which guides the pin into the first slot path 74 to move the tread to the retracted position.

Figure 13:
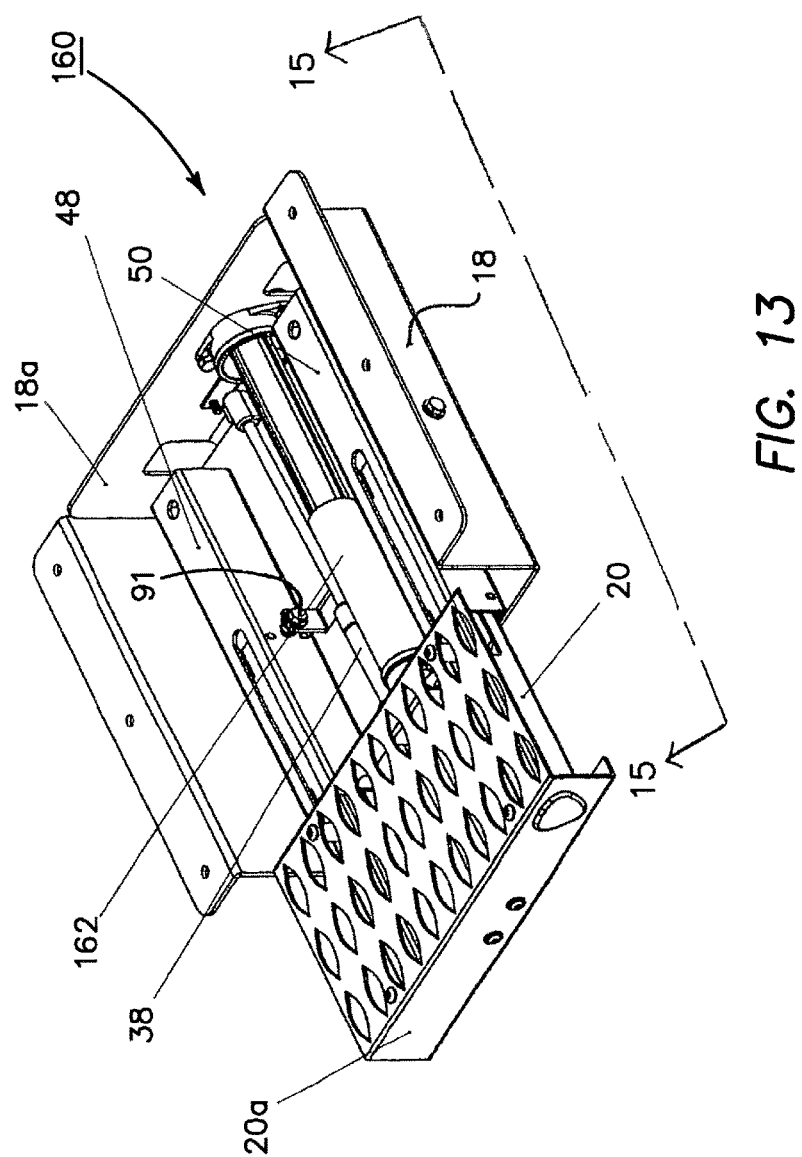
FIG. 13 is a perspective view of another embodiment of the present invention in the step position thereof.
Figure 14:
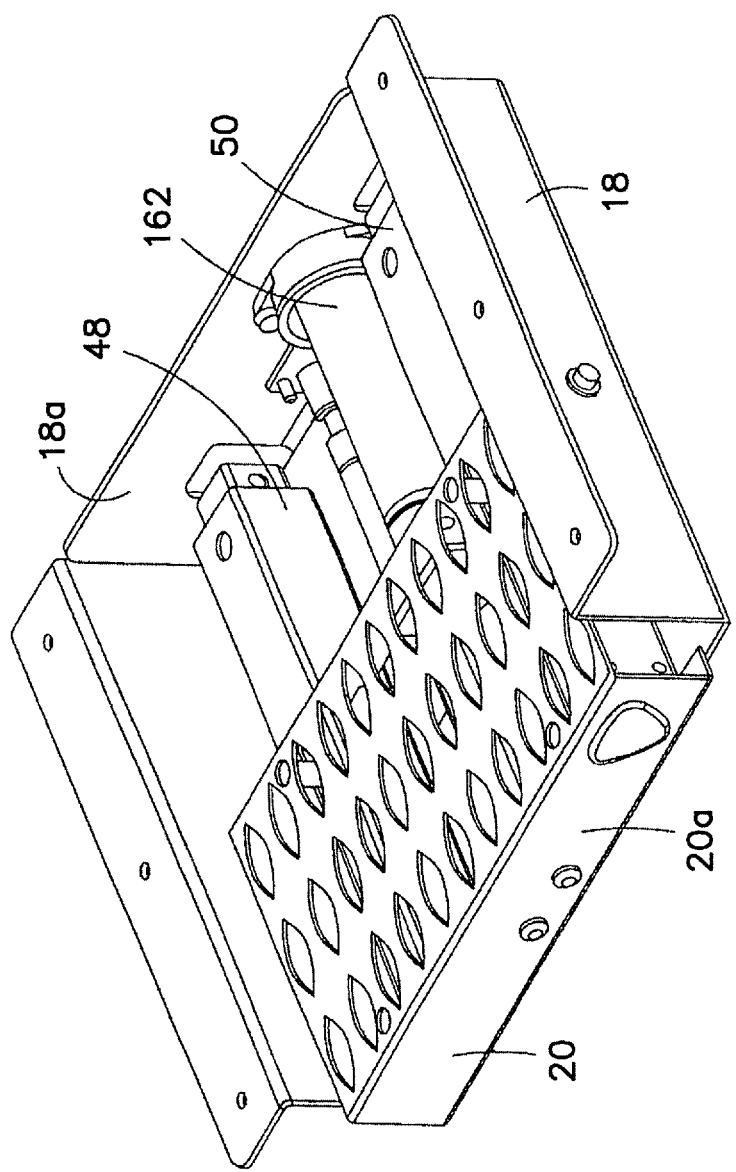
FIG. 14 is a perspective view of the embodiment shown in FIG. 13 in the retracted position thereof.

FIGS. 13 to 22 illustrate another embodiment 160 of the present invention. The embodiment 160 is generally similar to the embodiment 32 described above except that there is provided an indexing mechanism 162 which differs from the indexing mechanism described above. FIG. 13 illustrates the embodiment 160 in the step position thereof wherein the tread 20 is extended outwardly from the frame 18. FIG. 14 illustrates the embodiment 160 in the retracted position thereof and FIG. 15 illustrates the embodiment 160 taken along the line 15-15 of FIG. 13. FIG. 15A illustrates a detail of the embodiment 160. FIG. 13 shows the bolt 45 in the flange 41 as shown on FIG. 6.

FIGS. 16 through 22 illustrate details of the indexing mechanism 160. As shown on FIG. 16, the indexing mechanism 160 has four basic components: an outer tube 180, an intermediate tube 182 slidingly mounted in the outer tube for primarily axial sliding motion therein, an inner tube 184 mounted in the intermediate tube 182 for sliding motion therewith as the intermediate tube 182 moves in the outer tube 180. The outer tube 180 has a flange end 188 which has a mounting flange 190 and the mounting flange 190 is bolted or otherwise secured to the end wall 18a of the frame 18. The outer tube 118 has an inside surface 192 and a plurality of tracks 194 which in embodiment 162 is four are on the inner surface 192 and the tracks 192 have flange end teeth 195, shown in more detail on FIG. 17 as discussed below, and at an inner end 197 of the outer tube 180 the four tracks 194 have a tab 196 projecting radially inwardly. The flange end teeth 195 are spaced axially from the outer surface 201 of the flange 190.

The intermediate tube 182 has a plurality of slots 202 on the outer surface 205 and the number of slots 202 is the same as the number of tracks 195 on the outer tube 180. The intermediate tube 182 has an outer end 207 and an inner end 203 and the outer end 207 has a plurality of teeth 210 on the annular outer end 207. The slots 202 have an end 211 which are adapted to engage the tabs 196 so as to align the outer tube 180 and intermediate tube 182 when the step 160 is in the step position as shown on FIG. 13. The intermediate tube 182 has a plate 213 covering the inner end 203 and the plate 213 has an aperture 215 therethrough concentric with the axis 161 about which the outer tube 180, the intermediate tube 182 and the inner tube 184 are concentric.

The inner tube 184 and the ring gear 186 are mounted in the intermediate tube 182 and are shown spaced therefrom in FIG. 16 for clarity of description. The inner tube 184 has an outer end 220 with a shoulder 222 on the outer surface 223. The inner tube 184 has a plate 225 closing the inner end 229 and the plate 225 has an aperture 227 there through which is concentric to the axis 161 and aligned with the aperture 217 in the plate 213 of the intermediate tube 182. The outer surface of the plate 225 abuts the inner surface of the plate 113 in the intermediate tube 182.

The ring gear 186 is slidingly mounted on the outside surface 223 of the inner tube 184 and has an outer end surface 230 which abuts the shoulder 222 of the inner tube 186 and an inner end surface 232. The ring gear 186 has an outer cylindrical surface 234. and two sets of teeth. The details of the teeth are shown on FIG. 16A. A first outer set of teeth 240 is on the outer cylindrical surface 234 of the ring gear 186 and has twice the number of the slots 202 of the intermediate tube 182. The first outer set of teeth 240 extend from the outer end surface 230 towards the inner end surface 232 and has a slant edge 240a. The second inner set of teeth 250 extend from the inner end surface 230 of the ring gear 186.

Figure 18A:
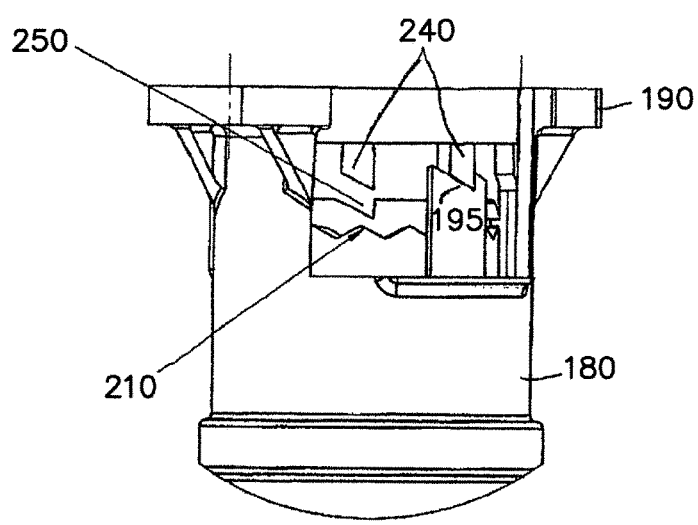
Figure 18:
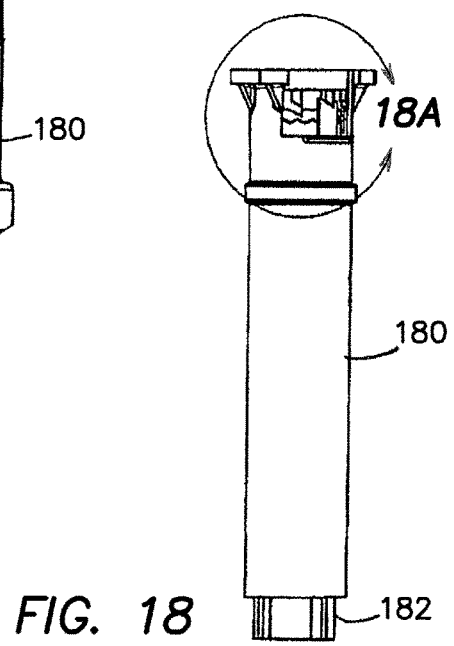

FIGS. 17 and 18 show the indexing mechanism 162 in the locked position thereof which is the condition of the step embodiment 160 in the retracted position thereof as shown on FIG. 14. As shown in FIGS. 17 and 18, four of the eight ring gear outer teeth 240 have the edge 240a engaged with the four flange end teeth 195 of the tracks 194. As shown in FIGS. 17 and 18, the flange end teeth 195 have a "saw tooth" configuration and the ring gear outer teeth 240 are operatively engaged therein. The intermediate tube 182 is spaced slightly axially inwardly from the ring gear inner teeth 250. The resilient mechanism 38 maintains the force on the indexing mechanism 162 to hold the components in the locked position thereof as shown in FIGS. 17 and 18. The four ring gear inner teeth are positioned separated from and half way across the intermediate gear teeth 210.

Figures 19, 19A:
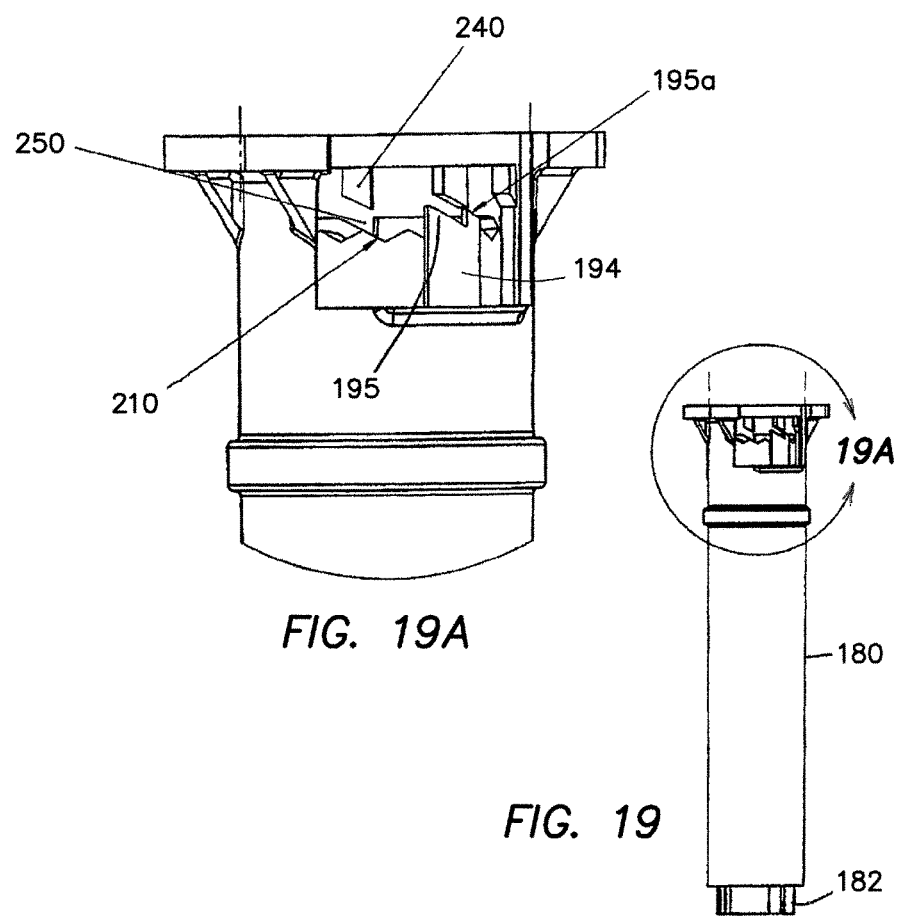
Figure 20:
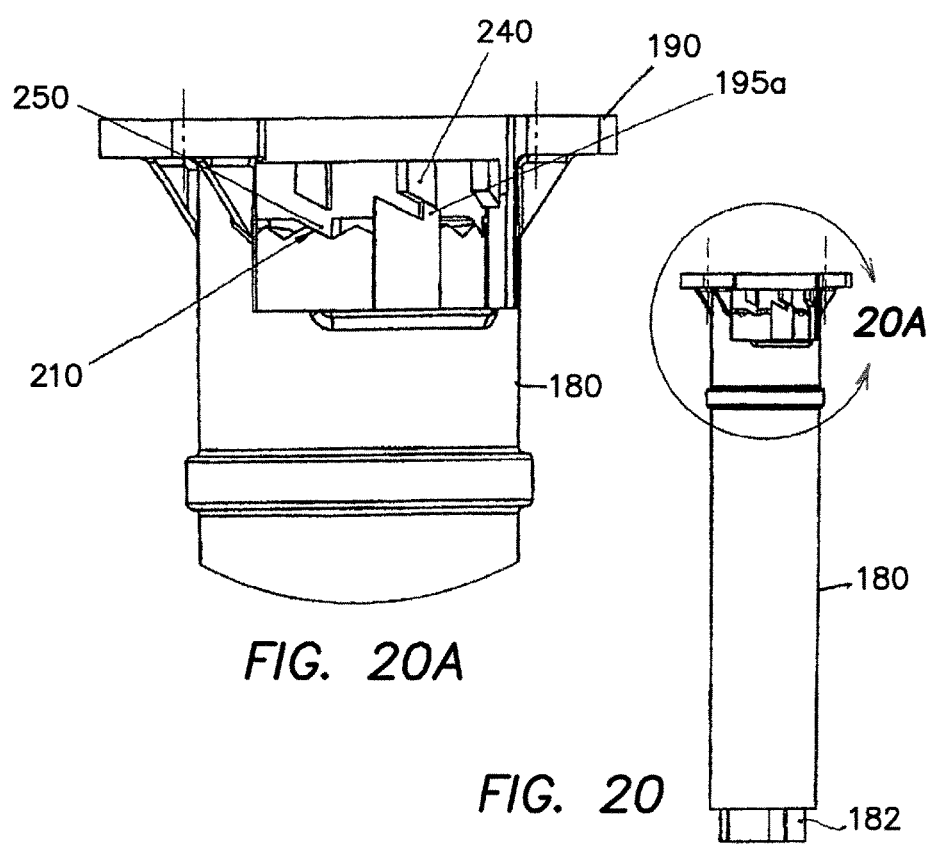
Figure 21:
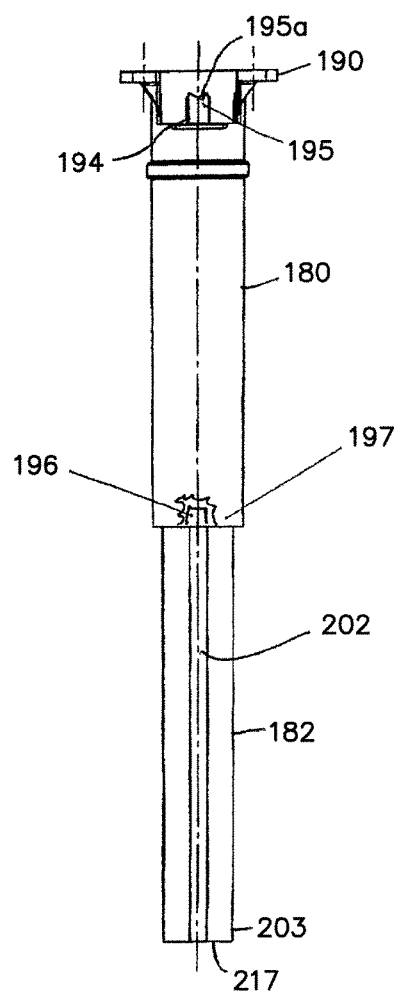

When it is desired to move the step 160 from the locked, retracted position shown in FIGS. 14 and 16 and as detailed on FIGS. 17, 17A, 18 and 18A to the unlocked position wherein the tread 20 is extended outwardly as shown on FIGS. 13 and 15 and as detailed in FIGS. 19, 19A, 20 an inward pressure is placed on the tread 22 to move the tread 22 inwardly against the force of the resilient mechanism 38. FIGS. 19 and 20 illustrate the position of the indexing mechanism 162 of the step 160 when it is first moved from the locked position. As shown thereon the intermediate tube teeth 210 push against the ring gear inner teeth 250. Such action lifts the gear outer teeth 240 above the flange end teeth 195. The ring gear inner teeth 250 slide down intermediate tube teeth 210 and such action causes the ring gear outer teeth to slide down the outer portion 195a of the flange end teeth 195. In this position, the indexing mechanism 162 is unlocked and under the force of the resilient mechanism 38, the inner tube 184, the ring gear 186 and the intermediate tube 182 move axially in the outer tube 180 to the position shown on FIGS. 21 and 22 under the influence of the resilient mechanism 38. Such axial movement continues until the end 211 of the slots 202 engage the stop 196 on the inside of the outer tube 180.

Figure 22:
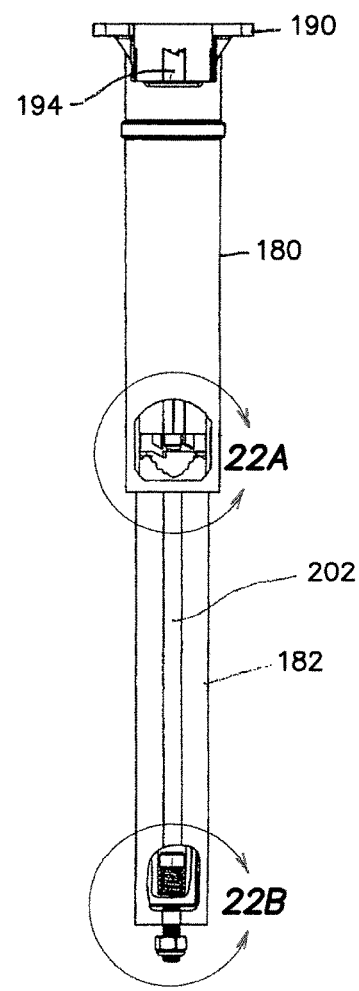
Figures 22A, 22B:
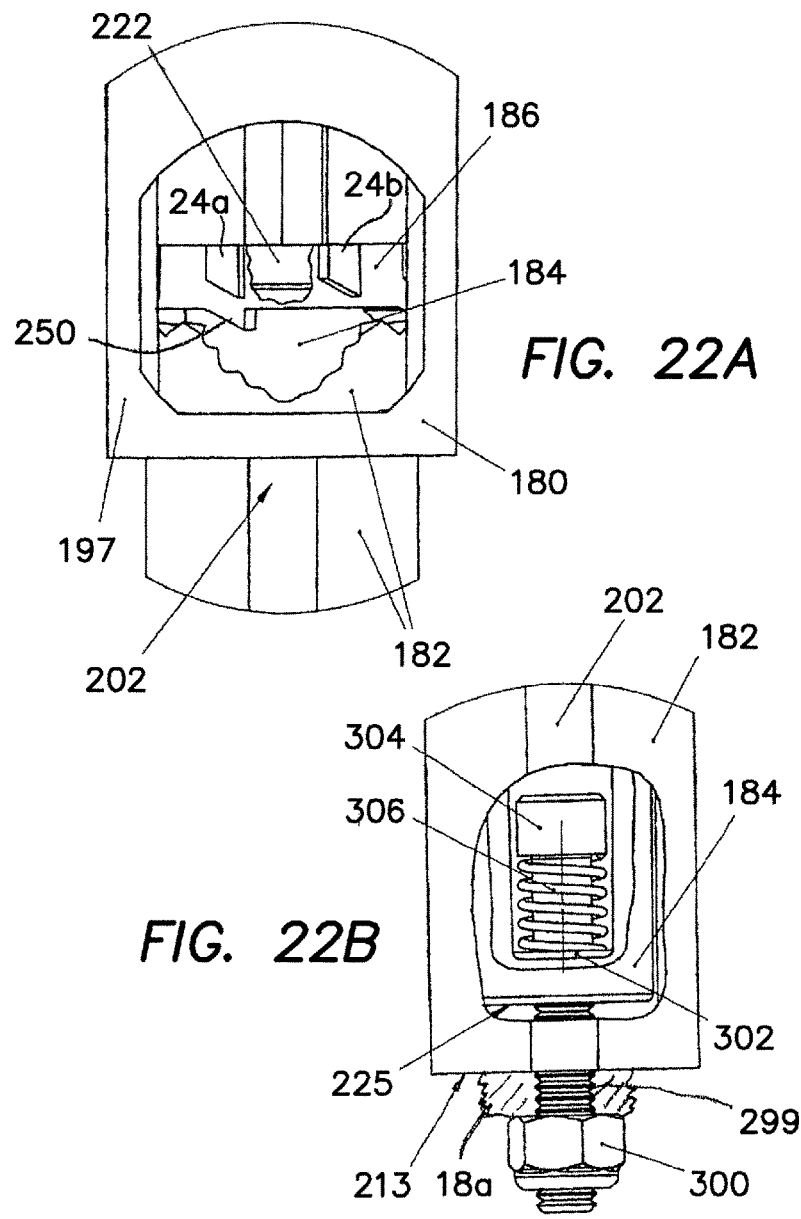

FIGS. 22, 22A and 22B illustrate the position of the indexing mechanism 162 for the condition of the step 132 fully extended outwardly. As shown in FIG. 22B, there is provided a bolt 299 with a bolt head 304 inside the inner tube 184 at the inner end 184a and the bolt extends through the plate 225 of the inner tube 184, through the plate 213 of the intermediate tube 182, through the wall 18a of the frame 18 and is held in place by nut 300. A spring 306 is provided between the bolt head 304 and the washer 302 bearing against the inside surface of the plate 225 of the inner tube 184.

While particular embodiments and applications of the present invention have been above described an illustrated, the present invention is not limited to the precise construction and arrangements disclosed. Those persons knowledgeable in the art may conceive of certain modifications, changes and variations in the detailed embodiments disclosed above as illustrative, to suit particular circumstances or products to be formed. The invention is therefore not intended to be limited to the preferred embodiments depicted, but only by the scope of the appended claims and the reasonably equivalent apparatus and methods to those defined therein.

What is claimed is:

1. A retractable, pull-out step for a vehicle, comprising, in combination:
   a frame member having:
      a base plate in a first plane;
      said base plate having an inner wall upstanding from the base plate at an inner edge thereof, and a pair of spaced apart side walls upstanding from said base plate, and an outer edge;
   a pair of flange members, one of said pair of flange members connected to each of said side walls and extending outwardly therefrom, said flange members being disposed in a second plane spaced from said first plane of said base plate;
   a pair of guides mounted on said base plate in spaced apart relationship, and said guides extending from regions adjacent said inner wall of said base plate to regions adjacent said outer edge of said base plate;
   at least one of said pair of guides having first walls defining a guide aperture slot therethrough;
   a tread having a tread surface and an outer wall depending from said tread surface, said tread mounted for reciprocating motion on said frame between a retracted locked position wherein said tread overlies said base plate of said frame and a step position extending outwardly from said base plate of said frame;
   a pair of rails, mounted on said tread for movement therewith and one of said pair of rails being disposed in each of said guides for sliding reciprocating movement therein for the movement of said tread between said step position and said locked position;
   a resilient mechanism connected between said inner wall of said frame and said outer wall of said tread for yieldingly urging said tread into said step position thereof and yieldingly resisting movement of said tread from said step position to said retracted position, the resilient mechanism comprising one of a gas spring cylinder, a coil spring, and a leaf spring; and
   an indexing mechanism comprising a plurality of telescoping tubes having an outer tube, an intermediate tube slidingly mounted in said outer tube, an inner tube mounted in said intermediate tube, said inner tube having a shoulder at an outer end thereof, and further comprising a ring gear slidably mounted on said inner tube, the indexing mechanism being operatively connected to said frame and said tread for locking said tread in said retracted position thereof and guiding said tread between said retracted position and said step position, said indexing mechanism being movable from a locked condition thereof for limited movement toward said inner wall of said frame to release said tread from said locked position and allow said yieldingly resilient mechanism to move said tread to said step position.

2. The retractable, pull-out step for a vehicle recited in claim 1 wherein said outer tube has a flange end coupled to said tread and an inner end, and said outer tube having a plurality of axially extending tracks on an inferior surface thereof, and said tracks having flange teeth in regions adjacent said flange end and stop tabs in regions adjacent said inner end; said intermediate tube has an outer end and an inner end, and said outer end having a plurality of intermediate tube teeth thereon and said intermediate tube having an outer surface and having a plurality of slots on said outer surface and said slots extending from said inner end to a stop end in regions spaced from said outer end, and stop end of said tracks operatively and selectively engaging said stops on said tracks of said outer tube.

3. The retractable, pull-out step for a vehicle recited in claim 2 wherein said ring gear has a first set of ring gear outer teeth on an outer peripheral surface thereof and a second set of ring gear inner teeth on an inner torroidal surface thereon and said ring gear having an outer peripheral surface for engaging said shoulder on said inner tube.

4. The retractable, pull-out step for a vehicle recited in claim 3 wherein said inner tube has a base plate covering said inner end thereof and has a bolt accepting aperture therethrough, said intermediate tube having a base plate covering said inner end thereof and having an aperture therethrough aligned with said aperture in said base plate of said inner tube.

5. The retractable, pull-out step for a vehicle recited in claim 4 and further comprising a bolt having a bolt head in said inner tube and a shank extending through said aperture in said base plate of said inner tube, through said base plate of said aperture in said base plate of said intermediate tube and through an aperture in said inner wall of said frame to have an outer portion extending away from said inner wall of said frame, and a nut on said outer portion of said shank against said inner wall of said frame, whereby said inner tube and said intermediate tube are retained against said inner wall of said frame.

6. The retractable, pull-out step for a vehicle recited in claim 5 wherein said flange end teeth of said outer tube have two portions and are adapted to selectively and operatively engage said ring gear outer teeth.

7. The retractable, pull-out step for a vehicle recited in claim 6 wherein said intermediate tube teeth are adapted to selectively and operatively engage said intermediate tube teeth.

8. The retractable, pull-out step for a vehicle recited in claim 7 wherein said engagement of said ring gear outer teeth with said flange end teeth of said outer tube is for the condition of said tread in said retracted position to lock said tread in said retracted position.

9. The retractable, pull-out step for a vehicle recited in claim 8 wherein the number of said plurality of slots on said outer surface of said intermediate tube is the same number as the number of tracks on said inner surface of said outer tube, and said plurality of slots on said outer surface of said intermediate tube are spaced in the same spacing as said tracks on said inner surface of said outer tube.

10. The retractable, pull-out step for a vehicle recited in claim 5 and further comprising a spring around said shank of said bolt in said inner tube and bearing against said bolt head and an inner surface of said plate at said inner end of said inner tube.

11. The retractable, pull-out step for a vehicle recited in claim 1 wherein each one of said pair of flange members extends along an entire length of the side wall to the said one of said pair of flange members is connected.

\* \* \* \* \*